Figure 1:
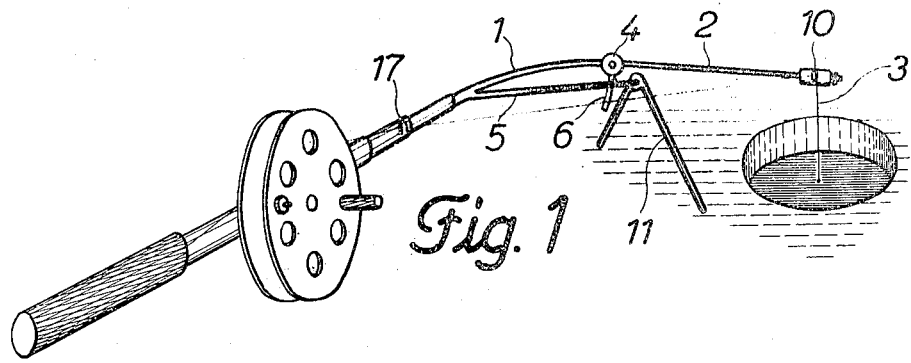

United States Patent
Ruppa

[11] 3,813,807
[45] June 4, 1974

[54] FISHING ROD

[76] Inventor: Aaro Arvo Ruppa, Kohnionkatu 75, Jyvaskyla, Finland

[22] Filed: Dec. 6, 1972

[21] Appl. No.: 312,496

[30] Foreign Application Priority Data
Oct. 27, 1972  Finland .............................. 2987/72

[52] U.S. Cl. .................................................. 43/15
[51] Int. Cl. ............................................ A01k 97/00
[58] Field of Search ........................................ 43/15

[56] References Cited
UNITED STATES PATENTS
2,578,887   12/1951   Jackson et al. ........................ 43/15

*Primary Examiner*—Hugh R. Chamblee
*Assistant Examiner*—Daniel J. Leach
*Attorney, Agent, or Firm*—Eric H. Waters

[57] ABSTRACT

A fishing rod consisting of two parts abutting to form a trunk part and a tip part, the fishing line departing downwardly from the latter. The parts are mutually connected by a pivot to be turnable in a vertical plane. The trunk part and the tip part are provided with arms projecting from them in a vertical plane and interacting with each other. The arms, under elastic yielding of the trunk part, are interlockable so that at a downwardly directed tug on the line, the interlocking is released and the tip part jerks upwardly owing to the elasticity of the trunk part.

10 Claims, 6 Drawing Figures

PATENTED JUN 4 1974 3,813,807

FISHING ROD

It is frequent angler practice to let go of the fishing rod and leave it on the edge of a hole in the ice, or resting on the side of the boat, while other operations are performed in the hope that a fish may strike the hook. It is indeed a fact that quite frequently a fish takes the bait off but is not caught on the hook, because there is no one to give the line a tug when the fish nibbles at the bait. Also, some fish play with the bait without fastening on the hook. This makes it difficult for an inexperienced angler to land the fish. Furthermore, certain fish (for instance, river trout and grayling) are so timid that they tolerate no float on the line. It is exceedingly difficult in such cases to give a tug at the precise, correct moment when the fish tugs at the bait.

Accordingly, the aim of the present invention is to improve the fishing rod so that the tip of the fishing rod will execute a swift upwardly directed tugging motion upon the slightest touch, by a fish of the bait or hook.

The invention is characterized in that the trunk part and tip part of the fishing rod have been provided with arms projecting from them in a vertical plane and interacting with each other. Due to elastic yielding of the trunk part, the arms can be interlocked so that a downwardly directed tug of the line causes the interlocking to be released and, as a result of the trunk part's elasticity, the tip part is jerked upwardly.

Due to the features described, the fishing gear having a fishing rod according to the invention can be left, with the arms projecting from the trunk and tip parts of the rod interlocked, e.g. on the rim of a hole in the ice or on the side of the boat with fairly great assurance that a fish nibbling the bait will be caught on the hook. It is obviously equally possible to hold such a fishing rod in the hand, in which instance the fish will be caught on the hook at the slightest touch of the bait.

It is advantageous if the swivelling motion of the tip part of the fishing rod with reference to its trunk part is confined to be so small that it barely suffices to release the interlocking of the arms. In that case, when the interlocking of the trunk and tip parts is released, the upward movement of the trunk part is transmitted in its entire magnitude to the tip part and, further, over the fishing line to the hook. At the same time, unnecessary and harmful motions of the tip part are prevented.

The interlocking and release of the arms on the trunk and tip parts of a fishing rod according to the invention can be conveniently arranged if the arms projecting from the trunk and tip parts have shoulders mating with each other in the interlocked position.

One of the embodiments of the invention is simplified by the feature that the arm projecting from the trunk part of the fishing rod has an aperture through which the projecting arm of the tip part may pass. The rim of said aperture may then serve in the capacity of a locking shoulder, and at the same time it may restrict the unnecessary movements of the tip part.

It is practical if the tip part has, on its end adjacent to the pivot, a projection against which the arm projecting from the trunk part strikes in the course of the locking operation, thereby turning the tip part so that the interlocking is automatically accomplished.

It is advantageous if the tip part of the fishing rod, according to the invention, comprises a fishing line guide movable along the tip part. It is then possible to adjust the force required for release to occur, by changing the length of the moment arm of the force in question. This is done by moving the fishing line guide. Adjustment of this force is necessary, for instance, when baits of different weights are used. The same ultimate result is achieved if the pivoted joint between the trunk and tip parts of the fishing rod is an adjustable friction joint, or if a spring of adjustable force is disposed in connection with the joint between the trunk and tip parts. In these cases, the force required for release can be adjusted by means of the friction joint or adjustable spring.

The usefulness and reliability of operation of a fishing rod according to the invention is further improved if there is, in association with the trunk part of the fishing rod, a detachable support, which keeps the fishing rod in its proper position.

The versatility of a fishing rod according to the invention increases if the arm projecting from the tip part carries a weight scale so that the line running across this scale indicates, on the scale, the weight of the fish suspended by the line. It is then possible to use the fishing rod to weigh the fish that have been caught.

Figure 2:
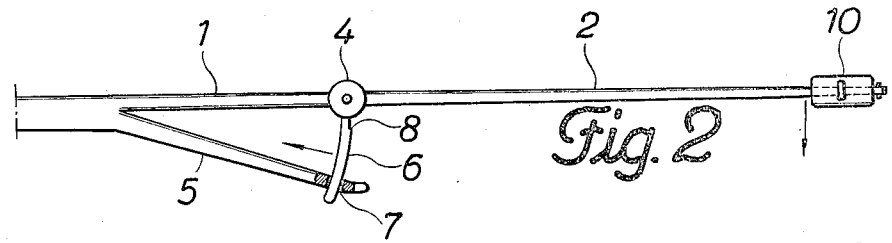
Figure 3:
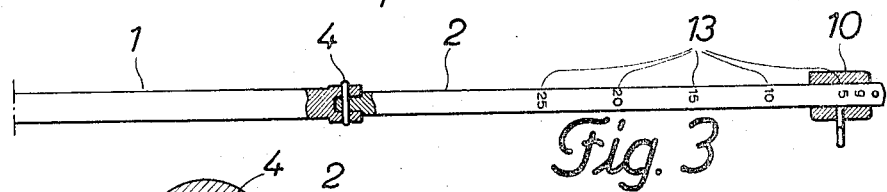
Figure 4:
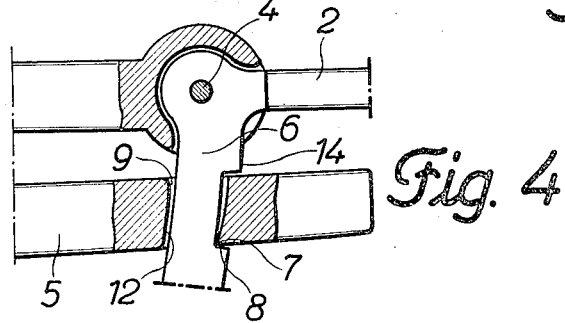
Figure 5:
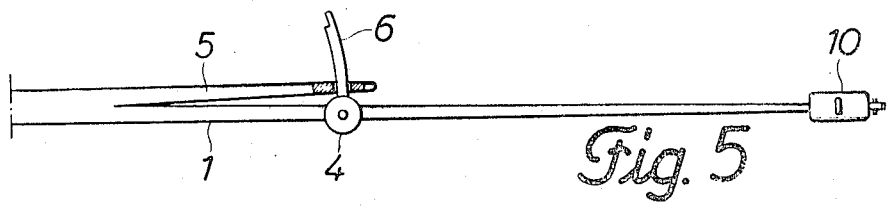
Figure 6:
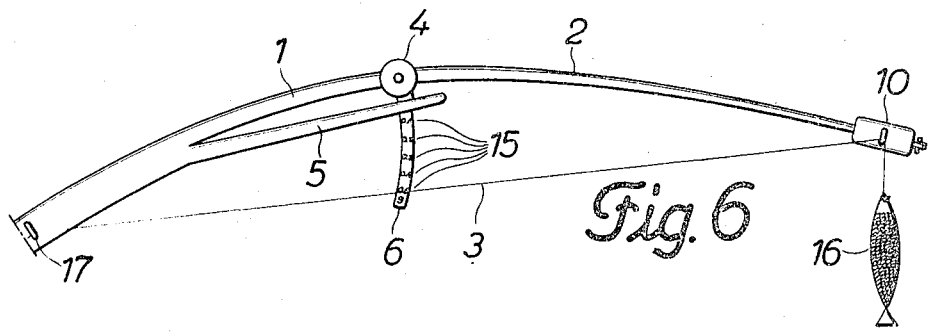

In the following, the invention is more closely described by the aid of an example, with reference to the attached drawing, wherein FIG. 1 shows a fishing gear provided with a fishing rod according to the invention, when left on the rim of a hole in the ice, FIG. 2 shows a fishing rod according to an embodiment of the invention, in elevational view, FIG. 3 shows the same fishing rod, viewed from above and partly in section, FIG. 4 shows on an enlarged scale the joint between the trunk and tip parts of the fishing rod, partly sectioned, FIG. 5 corresponds to FIG. 2 and shows another embodiment in elevational view, and FIG. 6 shows the use of a fishing rod according to the invention for weighing fish.

Referring now to FIG. 1, the arm 5 projecting from the trunk part 1 is interlocked with the arm 6 projecting from the tip part 2. In this position the trunk part has elastically yielded and has been bent into curved shape. The fishing rod is supported on the ice by means of a detachable bipod support 11 attached to arm 5. The interlocking of the arm 5 and the arm 6 is released when a fish tugs the tip part 2 downwardly by means of the line 3. This causes the tip part to jerk upwardly, owing to the elasticity of the trunk part, whereby the hook is impaled in the jaws of the fish.

Interlocking of the arms 5 and 6 is accomplished by pressing the trunk part 1 and the arm 5 towards each other. The arm 6 then enters the aperture 9 in the arm 5. The arm 5 strikes against the shoulder 14 on the portion adjacent to the joint 4 of the tip part 2 and turns the tip part so that interlocking is automatically accomplished by the shoulders 7 and 8.

A downwardly directed tug by a fish causes the arm 6 to move in a corresponding direction. This causes the interlocking to be released, and the tip part 2 is free to jerk upwardly, owing to the elasticity of the trunk part 1.

When the trunk part 1 jerks upwardly, the tip part 2 follows along with this movement, due to the stop 12. The stop 12 only permits rotation of the tip part through an angle sufficient to release the interlocking.

The release sensitivity of the interlocking between the arms 5 and 6 can be adjusted by means of the movable fishing line guide 10 shown in FIG. 3. Shifting of this fishing line guide changes the moment arm of the force releasing the interlocking, and at the same time changing the moment of the arm 6. In FIG. 3, markings 13 have been made on the tip part 2 of the fishing rod for different positions of the fishing line guide, consistent with different weights of the bait in use.

In FIG. 6 it is shown how the weight of a fish 16 suspended from the fishing line 3 passing through the fishing line guides 10 and 17 bends the trunk part 1 and tip part 2 into curved shape so that the weight of the fish can be read on the scale 15, where this scale is intersected by the fishing line.

It is obvious to one skilled in the art that the embodiments of the present invention may vary within the scope of the claims. It is thus possible to apply the invention, for instance, as shown in FIG. 5, wherein the arms 5 and 6 have been placed above the fishing rod. On the other hand, the joint between the trunk and tip parts may be a slightly yielding sleeve, whereby a simple embodiment is obtained. Furthermore, it is possible to place in this joint a spring which urges the tip part upwardly, whereby a fishing rod of the kind shown in FIG. 2 is automatically cocked when the trunk part and the arm projecting from same are pressed together.

I claim:

1. A fishing rod, comprising a trunk part and a tip part; a fishing line departing downwardly from the tip; a joint turnable in a vertical plane and joining said parts, the trunk part and the tip part having arms projecting from them in a vertical plane, said arms being interlockable under elastic yielding of the trunk part so that upon a downwardly directed tug on the line the interlocking is released and the tip part jerks upwardly due to the elasticity of the trunk part, said arms projecting from the said trunk and tip parts having shoulders mating in interlocked position of said arms.

2. A fishing rod, comprising a trunk part and a tip part; a fishing line departing downwardly from the tip part; a joint turnable in a vertical plane and joining said parts, the trunk part and the tip part having arms projecting from them in a vertical plane, said arms being interlockable under elastic yielding of the trunk part so that upon a downwardly directed tug on the line the interlocking is released and the tip part jerks upwardly due to the elasticity of the trunk part, said tip part having on its end adjacent to the joint a porjection which is struck by the arm projecting from the trunk part when interlocking, said projection turning the tip for interlocking automatically.

3. A fishing rod, comprising a trunk part and a tip part; a fishing line departing downwardly from the tip part; a joint turnable in a vertical plane and joining said parts, the trunk part and the tip part having arms projecting from them in a vertical plane, said arms being interlockable under elastic yielding of the trunk part so that upon a downwardly directed tug on the line the interlocking is released and the tip part jerks upwardly due to the elasticity of the trunk part, said tip part comprising a fishing line guide movable along the tip part.

4. A fishing rod, comprising a trunk part and a tip part; a fishing line departing downwardly from the tip part; a joint turntable in a vertical plane and joining said parts, the trunk part and the tip part having arms projecting from them in a vertical plane, said arms being interlockable under elastic yielding of the trunk part so that upon a downwardly directed tug on the line the interlocking is released and the tip part jerks upwardly due to the elasticity of the trunk part, the arm projecting from said tip part having a marked weight scale so that the fishing line running across the scale indicates the weight of the fish suspended from the line.

5. A fishing rod, comprising a trunk part and a tip part; a fishing line departing downwardly from the tip part; a joint turnable in a vertical plane and joining said parts, the trunk part and the tip part having arms projecting from them in a vertical plane, said arms being substantially elongated elements with axes oriented transversely, said arms being interlockable under elastic yielding of the trunk part so that upon a downwardly directed tug on the line the interlocking is released and the tip part jerks upwardly due to the elasticity of the trunk part.

6. Fishing rod according to claim 1, wherein said joint turns the tip part relative to the trunk part by an amount so small as to suffice only for the interlocking of the arms to be released.

7. Fishing rod according to claim 5, wherein the arm projecting from the trunk part has an aperture admitting the projecting arm of the tip part.

8. Fishing rod according to claim 5, wherein said joint between the trunk part and the tip part is an adjustable friction joint.

9. Fishing rod according to claim 5, wherein said joint between the trunk part and the tip part comprises a spring with adjustable force.

10. Fishing rod according to claim 5, including a detachable support associated with the trunk part for keeping the fishing gear in proper position.

* * * * *